(12) United States Patent
Yechieli

(10) Patent No.: US 9,201,478 B2
(45) Date of Patent: Dec. 1, 2015

(54) METHODS AND SYSTEMS FOR EFFICIENT BATTERY CHARGING AND USAGE

(75) Inventor: Eyal Yechieli, Tel Aviv (IL)

(73) Assignee: POWERPLUG LTD., Tel Aviv (IL)

( * ) Notice: Subject to any disclaimer, the term of this patent is extended or adjusted under 35 U.S.C. 154(b) by 520 days.

(21) Appl. No.: 13/570,310

(22) Filed: Aug. 9, 2012

(65) Prior Publication Data

US 2013/0042121 A1 Feb. 14, 2013

Related U.S. Application Data

(60) Provisional application No. 61/522,396, filed on Aug. 11, 2011.

(51) Int. Cl.
  *H02J 7/00* (2006.01)
  *G06F 1/26* (2006.01)
  *H02J 3/14* (2006.01)
  *H02J 7/02* (2006.01)

(52) U.S. Cl.
  CPC ... *G06F 1/26* (2013.01); *H02J 3/14* (2013.01); *H02J 7/02* (2013.01); *H02J 2003/146* (2013.01); *Y02B 40/90* (2013.01); *Y02B 70/3225* (2013.01); *Y04S 20/222* (2013.01); *Y04S 20/224* (2013.01)

(58) Field of Classification Search
  CPC .................................................. G06F 1/3212
  USPC ....................................................... 320/107
  See application file for complete search history.

(56) References Cited

U.S. PATENT DOCUMENTS

| | | | |
|---|---|---|---|
| 7,135,956 B2 | 11/2006 | Bartone et al. | |
| 8,358,103 B2 * | 1/2013 | Eastlack | 320/108 |
| 8,872,379 B2 * | 10/2014 | Ruiz et al. | 307/66 |
| 2003/0009705 A1 | 1/2003 | Thelander et al. | |
| 2008/0209247 A1 | 8/2008 | Thelander et al. | |
| 2009/0172163 A1 | 7/2009 | Carroll et al. | |
| 2009/0228725 A1 | 9/2009 | Carroll | |
| 2009/0313034 A1 * | 12/2009 | Ferro et al. | 705/1 |
| 2010/0131785 A1 | 5/2010 | Blackburn et al. | |
| 2011/0054846 A1 | 3/2011 | Karayi et al. | |
| 2011/0055609 A1 | 3/2011 | Karayi et al. | |
| 2011/0093588 A1 | 4/2011 | Karayi et al. | |
| 2011/0161707 A1 | 6/2011 | Blackburn et al. | |
| 2011/0175569 A1 * | 7/2011 | Austin | 320/109 |
| 2012/0005126 A1 * | 1/2012 | Oh et al. | 705/412 |
| 2012/0229077 A1 * | 9/2012 | Tsuchiya | 320/107 |
| 2012/0286574 A1 * | 11/2012 | Sawada et al. | 307/23 |

FOREIGN PATENT DOCUMENTS

WO    WO 2010042550 A2 *    4/2010    ............. H02J 3/32

* cited by examiner

*Primary Examiner* — Jack Chiang
*Assistant Examiner* — Brandon Bowers
(74) *Attorney, Agent, or Firm* — Finnegan, Henderson, Farabow, Garrett & Dunner, LLP

(57) ABSTRACT

Battery charging methods and systems for devices that have rechargeable batteries provide an efficient way to know when to charge a device's battery, and when to switch between the device's battery and an external power source as the device's power source. The methods and systems access thresholds for a plurality of power rates, obtain information about when different power rates are in effect and, after determining a current power rate based on the information, compare the threshold of the current power rate to the device's battery's charge level. Based on such a comparison, the methods and systems can determine whether the battery should be charged, and the methods and system can determine whether the device's battery or an external power source should be used as the device's power source.

20 Claims, 8 Drawing Sheets

METHODS AND SYSTEMS FOR EFFICIENT BATTERY CHARGING AND USAGE

CROSS-REFERENCE TO RELATED APPLICATIONS

This application claims the benefit of U.S. Provisional Application No. 61/522,396 filed Aug. 11, 2011, which application is incorporated herein by reference.

FIELD OF THE INVENTION

This application is directed towards methods and systems for battery charging and power source switching of battery-attached devices.

BACKGROUND OF THE INVENTION

Reducing the consumption of power in electrical systems is desirable for many reasons. For instance, electrical power can be expensive, and the cost is often charged based on the quantity used. Further, the total available power in an electrical system may be limited. Thus, reducing the power consumption of devices connected to an electrical system such as a power grid can reduce the strains on the electrical system and allow for more devices to operate on the system, or allow for other devices connected to the system to operate with higher power consumptions.

One technique of power consumption reduction is to monitor devices for activity. If no activity is found after some amount of time, the inactive device is put into a reduced power state. If a user wants to use the device when it is in the reduced power state, the user signals to the device in some manner indicating a desire to use the device, and then the device exits the reduced power state. However, this process can take time, and thus may not be desirable if a user does not want to wait for a device to exit the reduced power state. Further, if a device is actively being used, nothing is done to reduce power consumption.

Another technique of power consumption reduction is to monitor the processes operating on a device. If certain processes are not found to be operating on the device, the device transitions to a reduced power state. If one of the select processes is later initiated, the device transitions to a high power state. However, this technique does not reduce power consumption when the high power state processes are being used.

SUMMARY OF THE INVENTION

In accordance with one embodiment, as broadly described herein, a method of charging a battery associated with a portable device is disclosed. The method stores power rate data reflecting a value at which power is purchasable at a particular time, determines whether a charge level associated with the battery is below a predetermined battery-power threshold, and if a power source is available to the battery for charging, enables the power source to provide power to the battery for charging, when the charge level associated with the battery is below the predetermined battery-power threshold and the value of the power rate data is not above a predetermined amount.

In accordance with another embodiment, as broadly described herein, a system for charging a battery associated with a portable device is disclosed. The system comprises one or more processors, one or more memories, instructions stored on the one or more memories, which, when executed by the processor, cause the system to store power rate data reflecting a value at which power is purchasable at a particular time, determine whether a charge level associated with the battery is below a predetermined battery-power threshold, and if a power source is available to the battery for charging, enable the power source to provide power to the battery for charging, when the charge level associated with the battery is below the predetermined battery-power threshold and the value of the power rate data is not above a predetermined amount.

In accordance with another embodiment, as broadly described herein, a method of powering a portable device is disclosed, wherein the device is configured to draw power for operation from either one of a battery or a different power source. The method accesses power rate data reflecting a value at which power is purchasable at a particular time, determines whether a charge level associated with the battery is below a predetermined battery-power threshold, and enables the device to draw power from the battery for operation when the charge level associated with the battery is above the predetermined battery-power threshold and the value of the power rate data at a time that the power source is available to the battery for charging is above a predetermined amount.

In accordance with another embodiment, as broadly described herein, a system for charging a battery associated with a portable device is disclosed. The system comprises one or more processors, one or more memories, instructions stored on the one or more memories, which, when executed by the processor, cause the system to access power rate data reflecting a value at which power is purchasable at a particular time, determine whether a charge level associated with the battery is below a predetermined battery-power threshold, and enable the device to draw power from the battery for operation when the charge level associated with the battery is above the predetermined battery-power threshold and the value of the power rate data at a time that the power source is available to the battery for charging is above a predetermined amount.

Additional aspects related to the embodiments will be set forth in part in the description which follows, and in part will be obvious from the description, or may be learned by practice of the invention.

BRIEF DESCRIPTION OF THE DRAWINGS

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Reference will now be made in detail to the present embodiments (exemplary embodiments) of the invention, examples of which are illustrated in the accompanying drawings. Wherever possible, the same reference numbers will be used throughout the drawings to refer to the same or like parts.

When a device can use both a battery and an external power source, benefits may be obtained by optimizing the utilization of the battery and the external power source. For instance, in some embodiments, the battery of the device may be charged using the external power source if certain conditions are met. Further, in some embodiments, the power source of the device may be switched between the battery and the external power source if certain other conditions are met. In some embodiments, both battery charging and power-source switching may be implemented.

The conditions for performing battery charging and power source switching may be based on, for example, the charge level of the battery, time data, power rate data, charging thresholds associated with the power rate data, or combinations thereof. The charge level of the battery may provide an indication of how much charge remains on the battery. The time data may include information about the current time. The power rate data may include information about when a variety of power rates, representative of the cost or availability of power, are in effect. For example, power rate data may provide one or more values, each value representing cost, availability, or a combination thereof, of power at a particular time. In addition, in some embodiments, power rate data may also include information regarding user habits. For example, user habit information may indicate the times that a user typically connects a device to external power. The time data and power rate data may be used to determine a current power rate, with the current power rate corresponding to a given charging threshold. For example, if the cost of power is relatively low during the day and relatively high at night, and the user typically always has the device connected to external power, then a low power rate may be assigned during the day and a high power rate may be assigned at night. In contrast, for example, if the cost of power is relatively low during the day and relatively high at night, but the user typically only connects the device to external power at night, then a low power rate may be assigned at night.

In some embodiments, a comparison may be performed between the charge level of the battery and the charging threshold associated with the current power rate to determine whether to charge the battery. In some embodiments, a comparison may be performed between the charge level of the battery and the charging threshold associated with the current power rate to determine whether to supply power to the device using the battery or the external power source.

Figure 1:
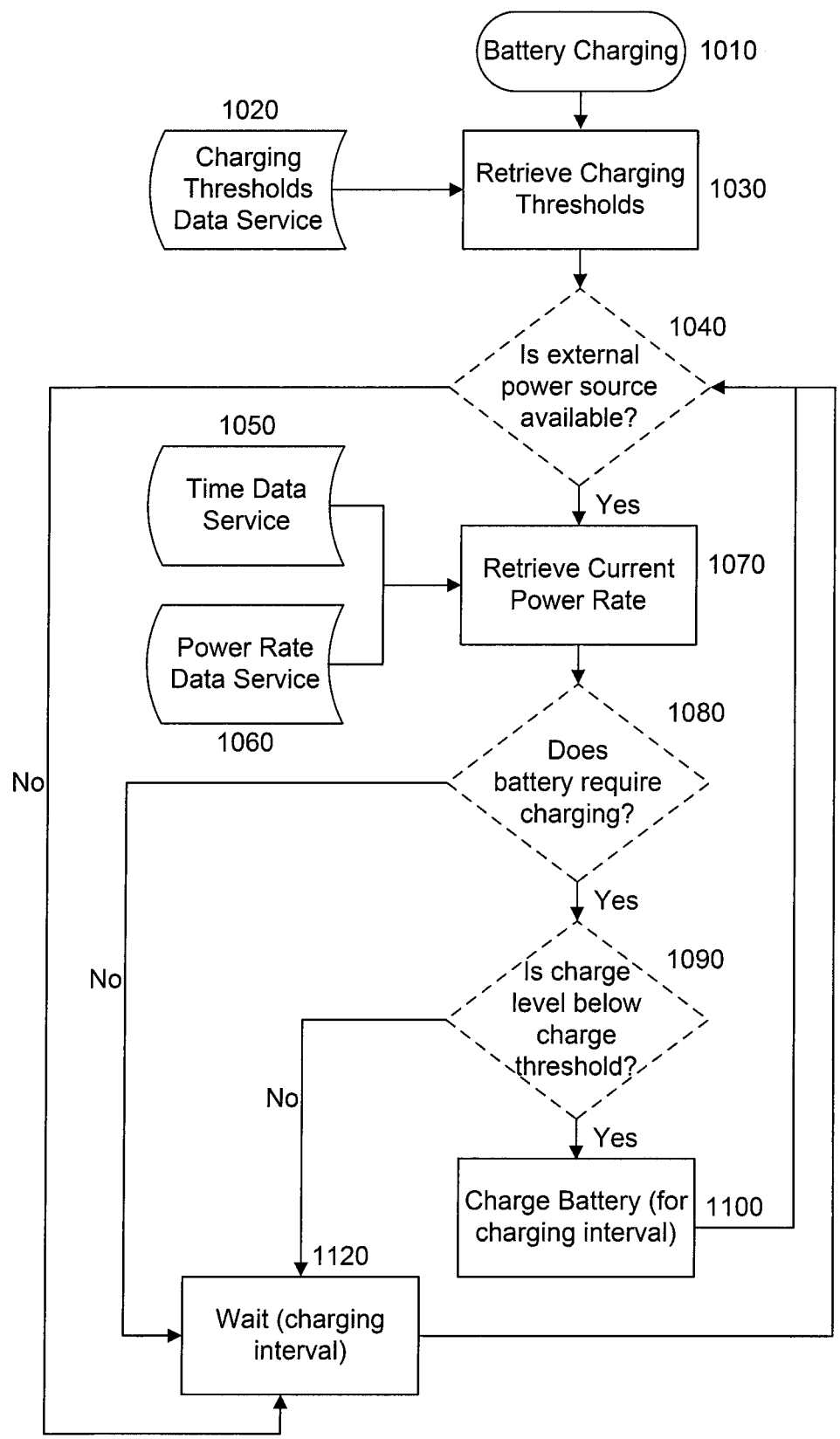
FIG. 1 is a flow chart of a battery charging method according to one embodiment.
Figure 4:
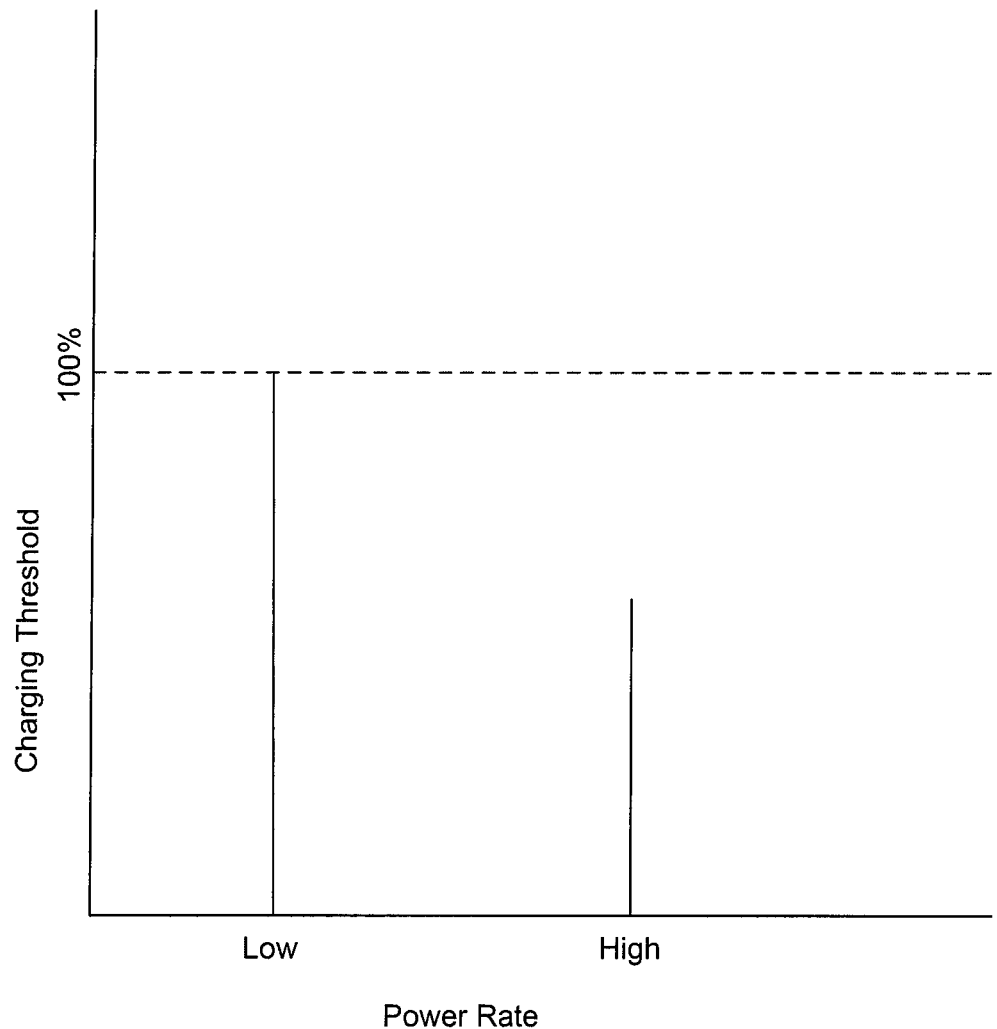
FIG. 4 is a chart that provides an example of the correspondence between two power rates and two respective charging thresholds.
Figure 5:
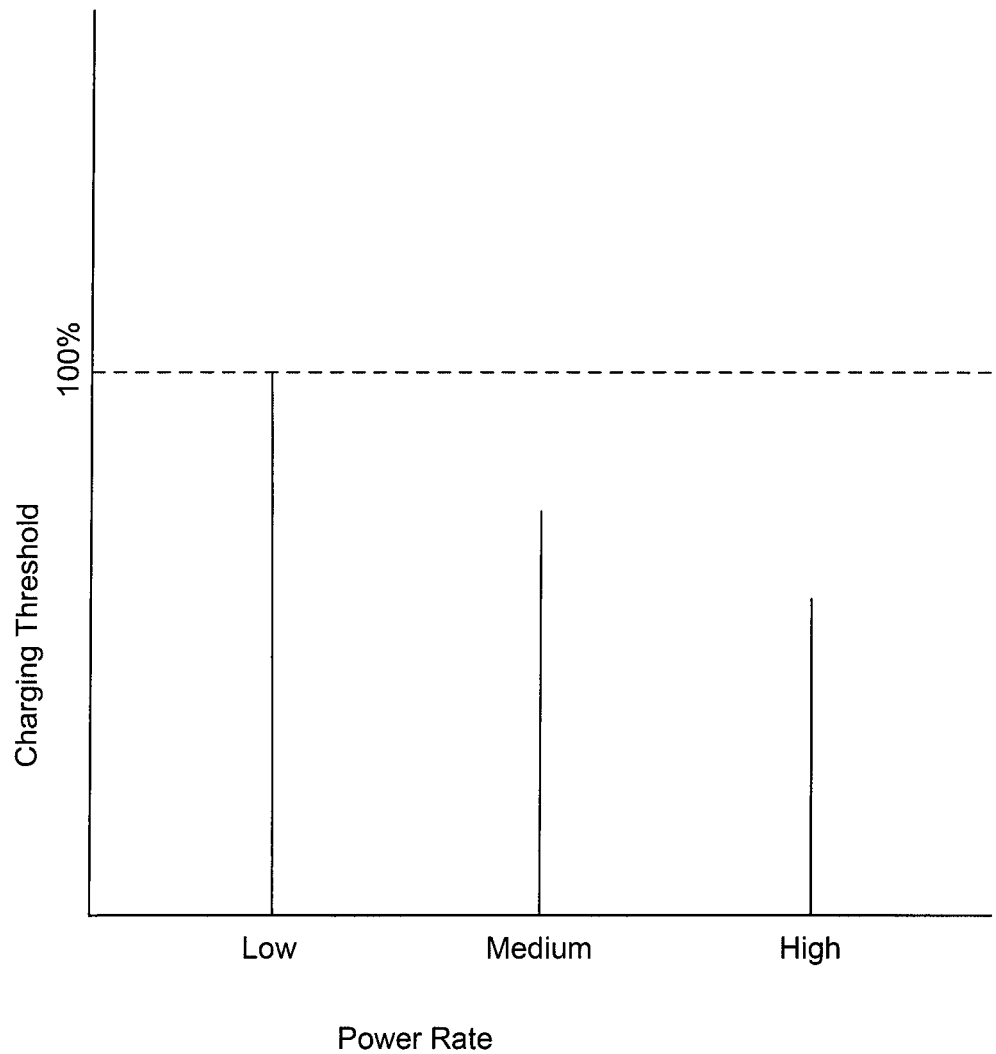
FIG. 5 is a chart that provides an example of the correspondence between three power rates and three respective charging thresholds.
Figure 6:
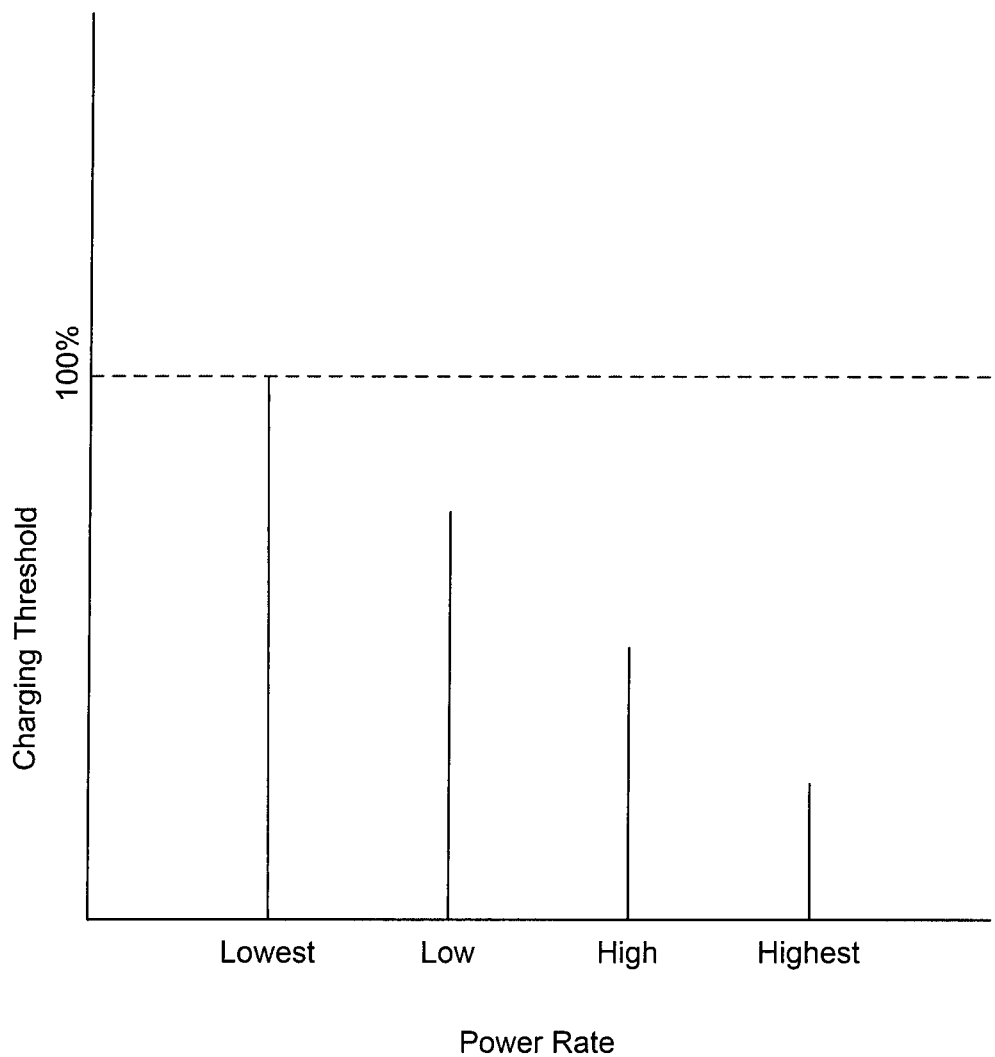
FIG. 6 is a chart that provides an example of the correspondence between four power rates and four respective charging thresholds.

FIG. 1 depicts a method of charging a battery of a device according to power rate. The method begins by retrieving charging thresholds from a charging thresholds data service 1020 (step 1030). Each charging threshold corresponds with a given power rate. For example, as shown in FIG. 5, there could be 3 different power rates: High, Medium, and Low, whereby each power rate would have a different corresponding charging threshold. However, any number of power rates greater than or equal to 2 could also be utilized. For example, FIG. 4 illustrates how a system could utilize two power rates, and FIG. 6 illustrates how a system could utilize four power rates. Generally, there is an inverse relationship between power rate and charging threshold, such that higher power rates correspond with lower charging thresholds.

A charging threshold generally refers to the battery charging level. A charging threshold can refer to the maximum battery charging level that should be reached when the power rate is in effect. For example, if the charging threshold for the "Medium" rate is set to 50%, the battery should be charged up to 50% when this rate is in effect. The charging threshold of the lowest rate is set to be higher than the other power rates, and can be, for example, at or near 100%.

Additionally, a charging threshold can also refer to the minimum battery level that should be reached when the power rate is in effect and the device is connected to an external power source. For example, if the charging threshold for the "Medium" rate is set to 50%, the device can draw power from the battery until the battery is 50% charged instead of taking the power from an external source.

After retrieving the charging thresholds, a determination is made as to whether an external power source is available (step 1040). If no external power source is available, the device is instructed to wait for a charging interval (step 1120) before returning to the determination of whether there is an external power source available (step 1040). The charging interval refers to a basic time unit for performing a charging operation. For example, a charging interval can be 15 minutes. However, different charging intervals can also be used.

If an external power source is available, a retrieval operation is performed to retrieve the current power rate (step 1070). To retrieve the current power rate, at least one of a time data service 1050 and a power rate data service 1060 is accessed. The time data service 1050 and power rate data service 1060 may be accessed, for example, from a local cache or a remote server. The time data service 1050 provides the current time. The power rate data service 1060 provides information on the power rates and when each power rate is in effect. For instance, during periods of high power usage or high power costs of the external power source, the power rate data service 1060 would indicate a high power rate (corresponding to a low charging threshold). Additionally, during periods of low power usage or low power costs of the external power source, the power rate data service 1060 would indicate a low power rate (corresponding to a high charging threshold).

After obtaining the current power rate, a determination is made as to whether the device's battery requires charging (step 1080). If the battery does not require charging, the device is instructed to wait for a charging interval (step 1120) before returning to the determination of whether there is an external power source available (step 1040). However, if the battery does require charging, a determination is made as to whether the charge level of the battery is below the charge threshold (step 1090). If the charge level of the battery is not below the charge threshold, the device is instructed to wait for a charging interval (step 1120) before returning to the determination of whether there is an external power source available (step 1040). However, if the charge level of the battery is below the charge threshold, the battery is charged for a charging interval (step 1100) before returning to the determination of whether there is an external power source available (step 1040).

Figure 2:
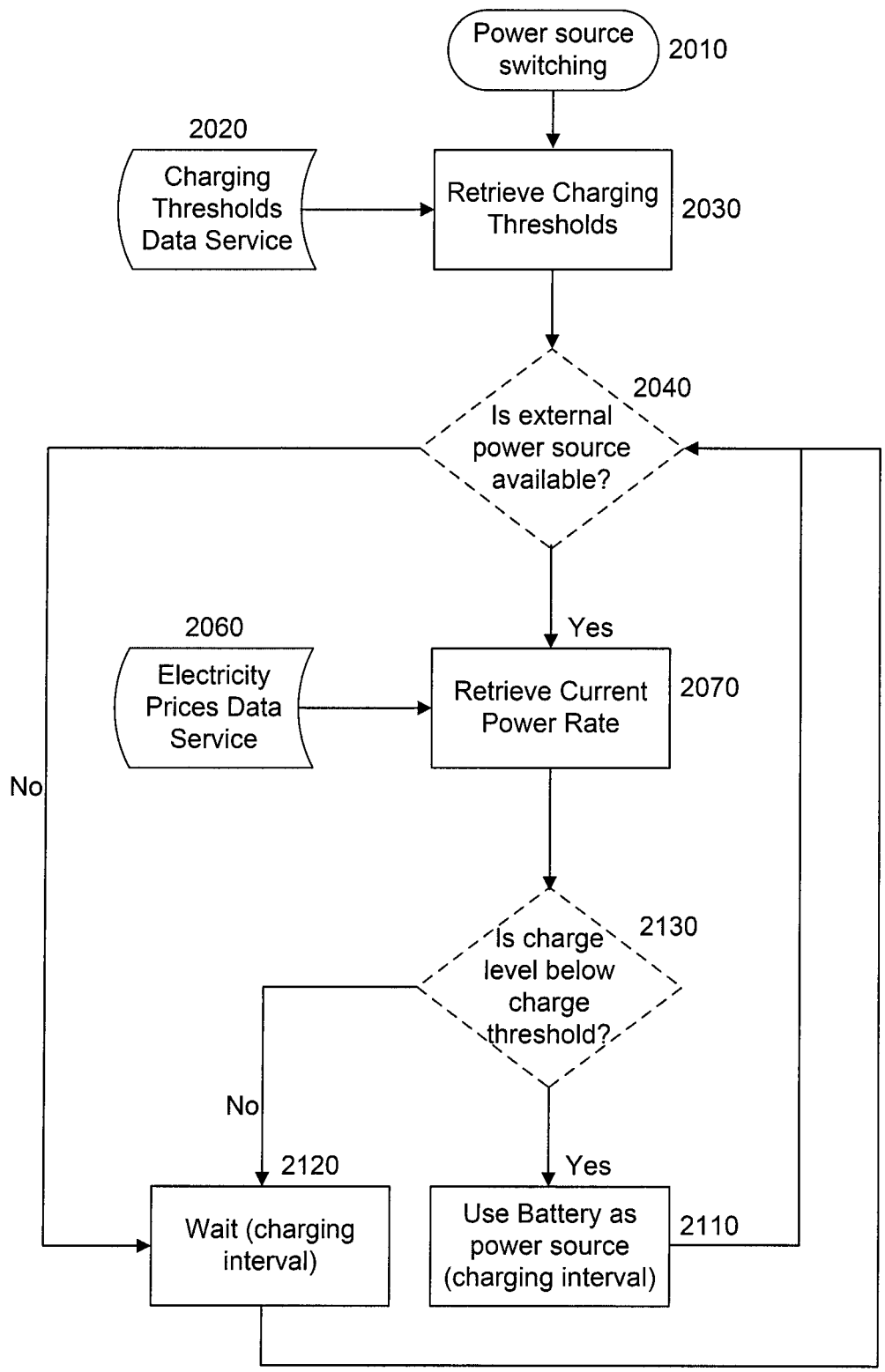
FIG. 2 is a flow chart of a power source switching method according to one embodiment.

FIG. 2 depicts a method of performing power source switching for a device according to power rate. The method begins by retrieving charging thresholds from a charging thresholds data service 2020 (step 2030) in substantially the same manner as described above with reference to FIG. 1. After retrieving the charging thresholds, a determination is made as to whether an external power source is available (step 2040). If no external power source is available, the device is instructed to wait for a charging interval (step 2120) before returning to the determination of whether there is an external power source available (step 2040).

If an external power source is available, a retrieval operation is performed to retrieve the current power rate (step 2070). In order to retrieve the current power rate, an electricity prices data service 2050 is accessed. The electricity prices data service 2050 provides for the cost of power at a particular time of day. For example, if the price of electricity is high, the power rate will be high, whereas if the price of electricity is low, the power rate will be low.

Once the current power rate is retrieved, a determination is made as to whether the charge level of the device is above the charge threshold (step 2130). If the charge level is not above the charge threshold, the device is instructed to wait for a charging interval (step 2120) before returning to the determination of whether there is an external power source available (step 2040). However, if the charge level is above the charge threshold, the device is instructed to use the device's battery as a power source for a charging interval (step 2110), even if the device is connected to an external power source other than the battery, before returning to the determination of whether there is an external power source available (step 2040).

Figure 3:
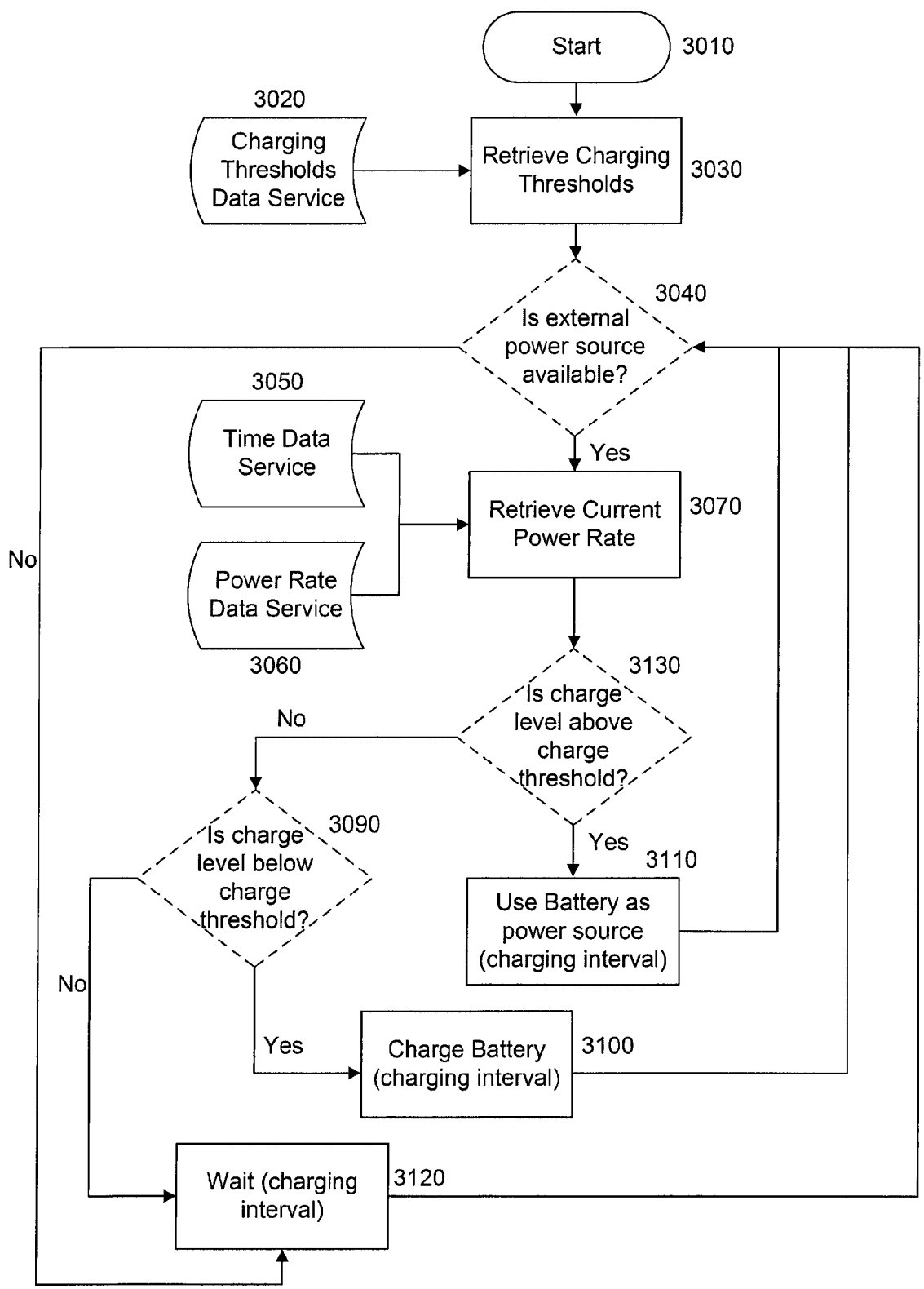
FIG. 3 is a flow chart of a battery charging and power source switching method according to one embodiment.

FIG. 3 depicts a method of performing both battery charging and power source switching for a device according to power rate. The method begins by retrieving charging thresholds from a charging thresholds data service 3020 (step 3030) in substantially the same manner as described above with reference to FIG. 1. After retrieving the charging thresholds, a determination is made as to whether an external power source is available (step 3040). If no external power source is available, the device is instructed to wait for a charging interval (step 3120) before returning to the determination of whether there is an external power source available (step 3040).

If an external power source is available, a retrieval operation is performed to retrieve the current power rate (step 3070). In order to retrieve the current power rate, at least one of a time data service 3050 and a power rate data service 3060 is accessed. The time data service 3050 provides the current time. The power rate data service 3060 provides information on the power rates and when each power rate is in effect. For instance, during periods of high power usage or high power costs of the external power source, the power rate data service 3060 would indicate a high power rate (corresponding to a low charging threshold). In contrast, during periods of low power usage or low power costs of the external power source, the power rate data service 3060 would indicate a low power rate (corresponding to a high charging threshold).

Once the current power rate is retrieved, a determination is made as to whether the charge level of the device is above the charge threshold (step 3130). If the charge level is above the charge threshold, the device is instructed to use the device's battery as a power source for a charging interval (step 3110) before returning to the determination of whether there is an external power source available (step 3040).

If the charge level is not above the charge threshold, a determination is made as to whether the charge level is below the charge threshold (step 3090). If the charge level of the battery is not below the charge threshold, the device is instructed to wait for a charging interval (step 3120) before returning to the determination of whether there is an external power source available (step 3040). However, if the charge level of the battery is below the charge threshold, the battery is charged for a charging interval (step 3100) before returning to the determination of whether there is an external power source available (step 3040).

Figure 7:
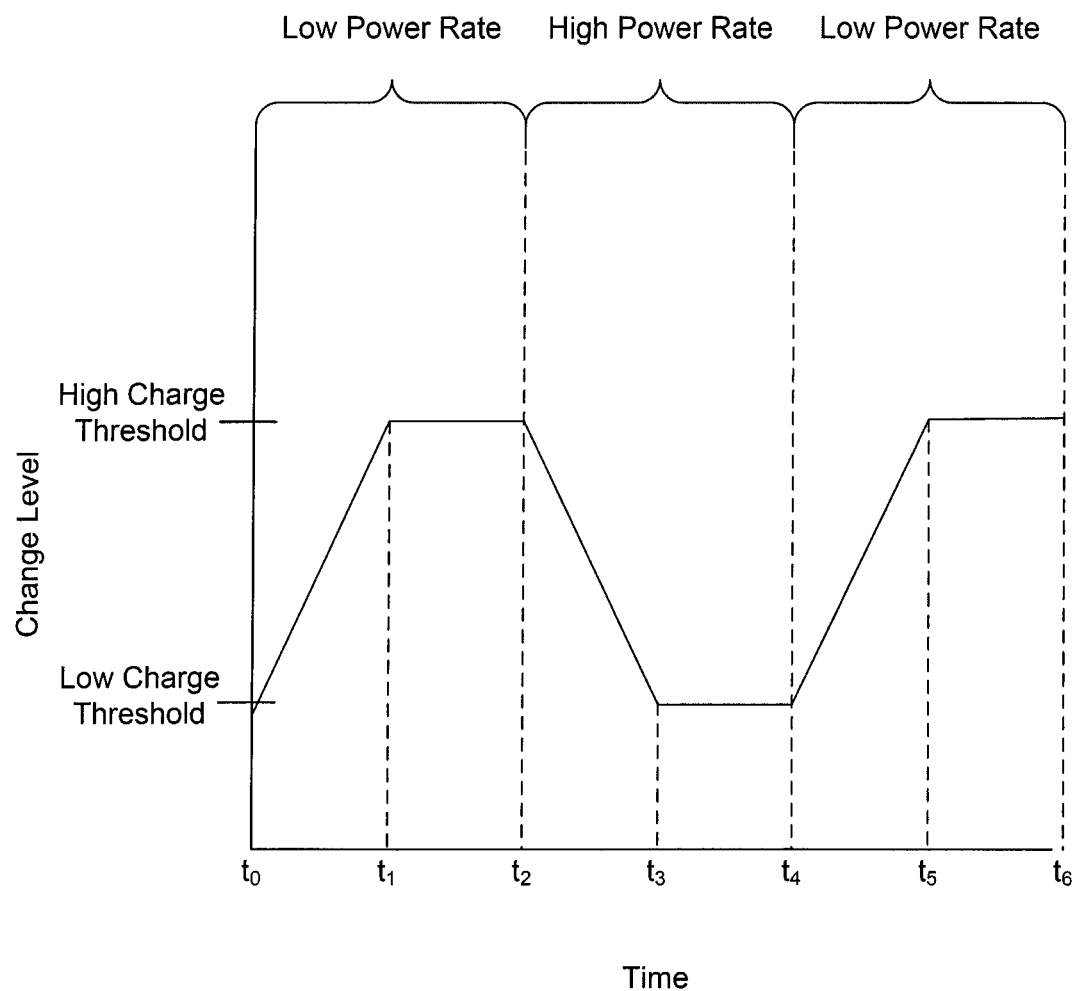
FIG. 7 is a chart that provides an example of the correspondence between two power rates and charge level over time.

FIG. 7 depicts a chart that provides an example of the correspondence between two power rates and charge level for a device over time in accordance with one embodiment of the invention. Between time $t_0$ and $t_1$, a low power rate is in effect while the device's battery has a charge level below the corresponding high charge threshold. Thus, between time $t_{j0}$ and $t_1$, the device's battery will charge.

At time $t_1$, the low power rate remains in effect, but the device's battery has reached the high charging threshold. Thus, the battery's charge level will remain at approximately the high charging threshold until the low power rate ends at time $t_2$. While FIG. 7 depicts a horizontal line between time $t_1$ and $t_2$, it will be appreciated that in some embodiments the charge level would alternate between rising and falling for a charge interval, indicative of the battery alternating between going above and below the high charging threshold.

Between time $t_2$ and $t_3$, a high power rate is in effect while the battery has a charge level above the corresponding low charge threshold. Thus, between time $t_2$ and $t_3$, the device's battery will power the device and not be charged. However, at time $t_3$, while the high power rate remains in effect, the battery's charge level reaches the low charging threshold. Thus, the battery's charge level will remain at approximately the low charging threshold until the high power rate ends at time $t_4$.

At time $t_4$, the low power rate goes back into effect, and thus the battery is charged until it reaches the high charging threshold at time $t_5$.

Figure 8:
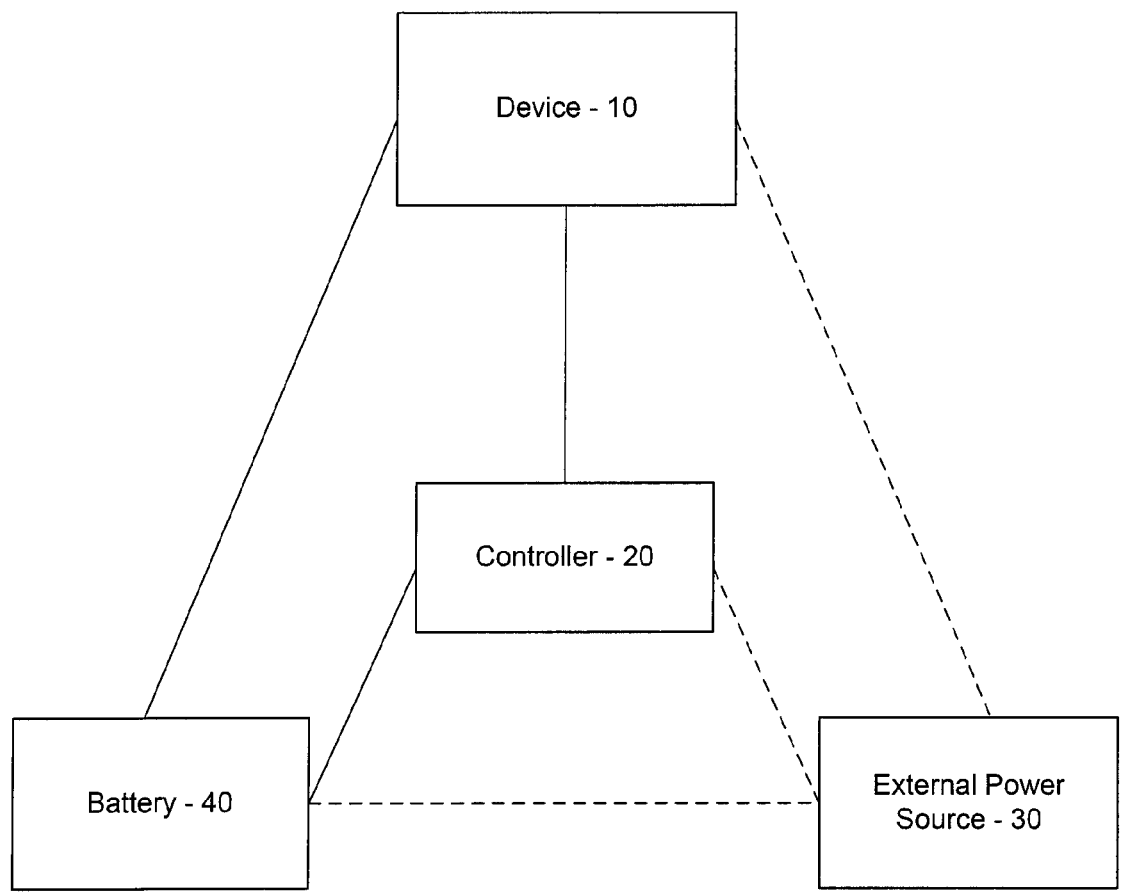
FIG. 8 provides an illustration of a system in which battery charging and power-source switching may be implemented.

FIG. 8 depicts a system in which battery charging and power-source switching may be implemented. As can be seen in FIG. 8, a controller 20 is connected to both a device 10 and a rechargeable battery 40. Further, as indicated by the dashed lines, an external power source 30 may also be connected to the controller 20.

Examples of the device 10 are a laptop computer, a tablet computer, a UPS, a computer that is attached to a UPS, and a cellular phone. However, other devices that include a rechargeable battery are also considered as being within the scope of the invention. The battery 40 may be either internal or external. The battery may be any rechargeable power source, such as a nickel metal hydride battery, a nickel cadmium battery, a lithium ion battery, a lithium polymer battery, or a fuel cell. The battery 40 could also comprise one or more different types of batteries. However, various other types of rechargeable batteries are also within the scope of the invention. The external power source 30 can be any power source that is not the battery 40 (the external power source 30 could be the same type as battery 40, so long as it is a separate power source). Examples of external power source 30 include a power grid, a power plant, an electrical generator, a turbine, a battery, or a solar panel. However, various other types of external power sources are also within the scope of the invention. The controller 20 can be a microprocessor or any circuit capable of electrically coupling the battery, external power source, and device for operation, including regulating the charge of the battery and drawing current from the external power source for charging the battery independent of providing power to the device for operation.

The above described embodiments can be implemented using software, hardware, or a combination of hardware and software. The software may be stored on a computer readable medium, such as RAM, ROM, hard disk, CD-ROM, DVD, and flash drive. However, other storage mediums are also within the scope of the invention. The software stored on a computer readable medium may be executed by the controller 20 in order to implement the above described embodiments.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of charging a battery associated with a portable device, the method comprising the following operations performed by one or more processors:
   storing power rate data reflecting a value at which power is purchasable at a particular time from a power source;
   storing an association between a set of power rates and a respective charging threshold;
   determining whether a charge level associated with the battery is below a predetermined battery-power threshold by comparing the charge level to the charging threshold corresponding to the stored power rate data;
   enabling the power source to provide power to the battery for charging when the power source is available to the battery for charging and the charge level associated with the battery is below the predetermined battery-power threshold and the value of the power rate data is not above a predetermined amount; and
   enabling the device to draw power from the battery for operation, when the charge level associated with the battery is above the predetermined battery-power threshold.

2. The method of claim 1, further comprising:
   enabling the device to draw power from the battery for operation, When the charge level associated with the battery is above a second predetermined battery-power threshold, the second predetermined battery-power threshold having a value less than the predetermined battery-power threshold, and the value of the power rate data is above a predetermined amount.

3. The method of claim 2, further comprising:
   if a power source is available to the battery for charging, enabling the power source to provide power to the battery for charging, when the charge level associated with the battery is below the second predetermined battery-power threshold.

4. The method of claim 1, further comprising:
   if a power source is available to the battery for charging, enabling the power source to provide power to the battery for charging, when the charge level associated with the battery is below a second predetermined battery-power threshold, the second predetermined battery-power threshold having a value less than the predetermined battery-power threshold.

5. The method of claim 1, wherein the power rate data comprises a set of values, each value representing an amount of money at which power is purchasable at a particular time.

6. A system for charging a battery associated with a portable device, the system comprising:
   one or more processors;
   one or more memories;
   instructions stored in at least one of the memories, which, when executed by at least one of the processors, causes the system to:
      store power rate data reflecting a value at which power is purchasable at a particular time from a power source;
      store an association between a set of power rates and a respective charging threshold;
      determine whether a charge level associated with the battery is below a predetermined battery-power threshold by comparing the charge level to the charging threshold corresponding to the stored power rate data;
      enable the power source to provide power to the battery for charging when the power source is available to the battery for charging and the charge level associated with the battery is below the predetermined battery-power threshold and the value of the power rate data is not above a predetermined amount; and
      enable the device to draw power from the battery for operation, when the charge level associated with the battery is above the predetermined battery-power threshold.

7. The system of claim 6, wherein the instructions stored in at least one of the memories, when executed by at least one of the processors, further causes the system to:
   enable the device to draw power from the battery for operation, when the charge level associated with the battery is above a second predetermined battery-power threshold, the second predetermined battery-power threshold having a value less than the predetermined battery-power threshold, and the value of the power rate data is above a predetermined amount.

8. The system of claim 7, wherein the instructions stored in at least one of the memories, when executed by at least one of the processors, further causes the system to:
   if a power source is available to the battery for charging, enable the power source to provide power to the battery for charging, When the charge level associated with the battery is below the second predetermined battery-power threshold.

9. The system of claim 6, wherein the instructions stored in at least one of the memories, when executed by at least one of the processors, further causes the system to:
   if a power source is available to the battery for charging, enable the power source to provide power to the battery for charging, when the charge level associated with the battery is below a second predetermined battery-power threshold, the second predetermined battery-power threshold having a value less than the predetermined battery-power threshold.

10. The system of claim 6, wherein the power rate data comprises a set of values, each value representing an amount of money at which power is purchasable at a particular time.

11. A method of powering a portable device, wherein the device is configured to draw power for operation from either one of a battery or a different power source, the method comprising the following operations performed by one or more processors:
    accessing power rate data reflecting a value at which power is purchasable at a particular time;
    storing an association between a set of power rates and a respective charging threshold;
    determining whether a charge level associated with the battery is below a predetermined battery-power threshold by comparing the charge level to the charging threshold corresponding to the stored power rate data;
    enabling the device to draw power from the battery for operation when the charge level associated with the battery is above the predetermined battery-power threshold and the value of the power rate data at a time that the power source is available to the battery for charging is above a predetermined amount; and enabling the power source to provide power to the battery for charging, when the charge level associated with the battery is below the predetermined battery-power threshold and the power source is available to the battery.

12. The method of claim 11, further comprising:

if a power source is available to the battery for charging, enabling the power source to provide power to the battery for charging, when the charge level associated with the battery is below a second predetermined battery-power threshold, the second predetermined battery power threshold having a value greater than the predetermined battery-power threshold, and the value of the power rate data at a time that the power source is available to the battery for charging is below a predetermined amount.

13. The method of claim 12, further comprising:

enabling the device to draw power from the battery for operation, when the charge level associated with the battery is above the second predetermined battery-power threshold.

14. The method of claim 11, further comprising:

enabling the device to draw power from the battery for operation, when the charge level associated with the battery is above a second predetermined battery-power threshold, the second predetermined battery-power threshold having a value greater than the predetermined battery-power threshold.

15. The method of claim 11, wherein the power rate data comprises a set of values, each value representing an amount of money at which power is purchasable at a particular time.

16. A system of powering a portable device, the system comprising:

one or more processors;
one or more memories;
instructions stored in at least one of the memories, which, when executed by at least one of the processors, causes the system to:
access power rate data reflecting a value at which power is purchasable at a particular time from a power source;
store an association between a set of and a respective charging threshold;
determine whether a charge level associated with the battery is below a predetermined battery-power threshold by comparing the charging level to the charging threshold corresponding to the stored power rate data;
enable the device to draw power from the battery for operation when the charge level associated with the battery is above the predetermined battery-power threshold and the value of the power rate data at a time that the power source is available to the battery for charging is above a predetermined amount; and
enable the power source to provide power to the battery for Charging, when the charge level associated with the battery is below the predetermined battery-power threshold.

17. The system of claim 16, wherein the instructions stored in at least one of the memories, when executed by at least one of the processors, further causes the system to:

if a power source is available to the battery for charging, enable the power source to provide power to the battery for charging, when the charge level associated with the battery is below a second predetermined battery-power threshold, the second predetermined battery-power threshold having a value greater than the predetermined battery-power threshold, and the value of the power rate data at a time that the power source is available to the battery for charging is below a predetermined amount.

18. The system of claim 17, wherein the instructions stored in at least one of the memories, when executed by at least one of the processors, further causes the system to:

enable the device to draw power from the battery for operation, when the charge level associated with the battery is above the second predetermined battery-power threshold.

19. The system of claim 16, wherein the instructions stored in at least one of the memories, when executed by at least one of the processors, further causes the system to:

enable the device to draw power from the battery for operation, when the charge level associated with the battery is above a second predetermined battery-power threshold, the second predetermined battery-power threshold having a value greater than the predetermined battery-power threshold.

20. The system of claim 16, wherein the power rate data comprises a set of values, each value representing an amount of money at which power is purchasable at a particular time.

* * * * *